(12) United States Patent
Demmig et al.

(10) Patent No.: US 12,049,575 B2
(45) Date of Patent: Jul. 30, 2024

(54) STRUCTURAL POLYURETHANE ADHESIVE HAVING GOOD ADHESION AFTER SHORT-DURATION HEATING

(71) Applicant: SIKA TECHNOLOGY AG, Baar (CH)

(72) Inventors: Martin Demmig, Quickborn (DE); Antonio Corsaro, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 707 days.

(21) Appl. No.: 17/260,434

(22) PCT Filed: Jul. 2, 2019

(86) PCT No.: PCT/EP2019/067765
§ 371 (c)(1),
(2) Date: Jan. 14, 2021

(87) PCT Pub. No.: WO2020/016003
PCT Pub. Date: Jan. 23, 2020

(65) Prior Publication Data
US 2021/0292621 A1  Sep. 23, 2021

(30) Foreign Application Priority Data
Jul. 17, 2018  (EP) ..................................... 18183837

(51) Int. Cl.
| C09J 175/06 | (2006.01) |
| C08G 18/12 | (2006.01) |
| C08G 18/32 | (2006.01) |
| C08G 18/42 | (2006.01) |
| C08G 18/48 | (2006.01) |
| C08G 18/50 | (2006.01) |
| C08G 18/76 | (2006.01) |

(52) U.S. Cl.
CPC ............ *C09J 175/06* (2013.01); *C08G 18/12* (2013.01); *C08G 18/3206* (2013.01); *C08G 18/4233* (2013.01); *C08G 18/4812* (2013.01); *C08G 18/4825* (2013.01); *C08G 18/4841* (2013.01); *C08G 18/5048* (2013.01); *C08G 18/7671* (2013.01); *C08G 2170/00* (2013.01); *C09J 2301/304* (2020.08); *C09J 2400/163* (2013.01); *C09J 2475/00* (2013.01)

(58) Field of Classification Search
CPC .............. C08G 18/423; C08G 18/4841; C08G 18/4825; C08G 18/5048; C09J 2301/304; C09J 2400/163; C09J 2475/00
See application file for complete search history.

(56) References Cited

U.S. PATENT DOCUMENTS

| 2015/0247073 A1* | 9/2015 | Kelch ................ C09J 175/06 528/84 |
| 2016/0053147 A1 | 2/2016 | Kelch et al. |
| 2019/0322914 A1* | 10/2019 | Kelch .................. C04B 40/065 |
| 2020/0017627 A1* | 1/2020 | Kelch ..................... C04B 26/16 |
| 2020/0239752 A1* | 7/2020 | Kaffee .................. F03D 1/0675 |
| 2022/0056324 A1* | 2/2022 | Shi ......................... B32B 15/082 |

FOREIGN PATENT DOCUMENTS

| EP | 2 700 666 A1 | 2/2014 |
| WO | 2014/184270 A1 | 11/2014 |
| WO | WO-2017103070 A1 * | 6/2017 ............. C08G 18/10 |

OTHER PUBLICATIONS

Thieme Verlag; : "Fatty Acids, Soya Oil, Castor Oil;" Rompp Chemie Lexikon, 10th edition; 1999; pp. 3824-3815, 1325-1327 and 4134.
Thieme Verlag; "Open time;" Rompp Chemie Lexikon, 10th edition; 2012.
Thieme Verlag; "Cathodic Electrocoat;" Rompp Chemie Lexikon, Online; 2018; https://roempp.thieme.de/roempp4.0/do/data/RD-05-00786.
Sep. 23, 2019 Search Report issued in International Patent Application No. PCT/EP2019/067765.
Jan. 19, 2021 International Preliminary Report on Patentability issued in International Patent Application No. PCT/EP2019/067765.

* cited by examiner

*Primary Examiner* — Michael L Leonard
(74) *Attorney, Agent, or Firm* — Oliff PLC

(57) ABSTRACT

A two-component polyurethane adhesive including a polyol component K1 and a polyisocyanate component K2; wherein the polyol component K1 includes at least one diol A1 having two primary hydroxyl groups and a molecular weight in the range from 60 to 150 g/mol, at least one triol A2 having an average molecular weight in the range from 1,000 to 10,000 g/mol, at least one polyester polyol A3 based on dimer fatty acids and/or dimer fatty alcohols, especially based on dimer fatty acids; and the polyisocyanate component K2 includes at least one polyisocyanate B1 and/or at least one polyurethane polymer B2 having isocyanate groups.

15 Claims, No Drawings

STRUCTURAL POLYURETHANE ADHESIVE HAVING GOOD ADHESION AFTER SHORT-DURATION HEATING

TECHNICAL FIELD

The invention relates to the field of two-component polyurethane adhesives, especially of viscoelastic structural polyurethane adhesives.

STATE OF THE ART

Two-component polyurethane adhesives based on polyols and polyisocyanates have already been used for some time. Two-component polyurethane adhesives have the advantage that they cure rapidly after mixing and can therefore absorb and transmit higher forces even after a short time. For use as structural adhesives, high demands in relation to strength and adhesion forces are made on such adhesives, since such adhesives are elements of load-bearing structures.

There is a particular desire for adhesives that develop a certain adhesion very rapidly, i.e. can be subjected to load even before they have cured completely, such that bonded parts can be moved at an early juncture, or the adhesive bond-fixing devices can be removed at an early juncture. This property is also referred to as "high early strength".

In automobile construction in particular, components provided with cathodic electrocoats can be bonded by heating the adhesive applied for a short period of time shortly after application, especially by means of IR radiation, to a temperature of 150° C. for about 40-60 seconds. It is difficult to achieve sufficient adhesion on such substrates with the IR preliminary curing mentioned. This preliminary curing typically relates only to a small portion (for example 10-20%) of the adhesive bead applied and joined; this operation is also referred to as "sticking". It increases "handling strength", which means that the bonded components can be processed further more quickly without becoming detached. It is particularly demanding to ensure sufficient adhesion directly after the IR preliminary curing, especially when the adhesive is still in the heated state.

The adhesives are still to be curable to the final strength both at ambient temperature and in a heat-accelerated curing process, and are to show good adhesion to metallic and non-metallic substrates. Moreover, these adhesives are to have high strength and high extensibility.

SUMMARY OF THE INVENTION

It is therefore an object of the present invention to provide a two-component polyurethane adhesive that has high early strength after heating for a short period of time after application, especially on cathodically electrocoated substrates. The heated adhesive is preferably to have sufficient adhesion directly after the IR preliminary curing, especially when the adhesive is still in the heated state. Moreover, these adhesives are to have high strength and high extensibility.

This object is surprisingly achieved by the polyurethane adhesive of the invention. It has been found that, surprisingly, the polyurethane adhesive of the invention, by virtue of the use of a polyester polyol A3 as a constituent of the polyol component, has elevated early strength and particularly good adhesion, especially on cathodically electrocoated substrates.

Furthermore, the composition, with additional use of an aliphatic polyol A4, undergoes faster development of adhesion and has improved storage stability of the polyol component.

Further aspects of the invention are the subject of further independent claims. Particularly preferred embodiments of the invention are the subject of the dependent claims.

Ways of Executing the Invention

The present invention relates to a polyurethane adhesive consisting of a polyol component K1 and a polyisocyanate component K2; wherein the polyol component K1 comprises at least one diol A1 having two primary hydroxyl groups and a molecular weight in the range from 60 to 150 g/mol, at least one triol A2 having an average molecular weight in the range from 1'000 to 10'000 g/mol, at least one polyester polyol A3 based on dimer fatty acids and/or dimer fatty alcohols, especially based on dimer fatty acids; and the polyisocyanate component K2 comprises at least one polyisocyanate B1 and/or at least one polyurethane polymer B2 having isocyanate groups.

The prefix "poly" in substance names such as "polyol", "polyisocyanate", "polyether" or "polyamine" in the present document indicates that the respective substance formally contains more than one of the functional group that occurs in its name per molecule.

In the present document, "molecular weight" is understood to mean the molar mass (in grams per mole) of a molecule. "Average molecular weight" is understood to mean the number-average molecular weight $M_n$ of an oligomeric or polymeric mixture of molecules, which is typically determined by means of GPC against polystyrene as standard.

A "primary hydroxyl group" refers to an OH group bonded to a carbon atom having two hydrogens.

The term "strength" in the present document refers to the strength of the cured adhesive, and strength especially means the tensile strength and modulus of elasticity, especially within the expansion range of 0.05% to 0.25%.

In the present document, "room temperature" refers to a temperature of 23° C.

In the present document, the term "fatty acids" is especially understood to mean fatty acids as described in the Römpp Chemie Lexikon [Römpp's Chemical Lexicon], 10th edition, Thieme Verlag.

In the present document, "soya oil" (also called soybean oil) is especially understood to mean soya oil as described in the Rompp Chemie Lexikon, 10th edition, Thieme Verlag.

In the present document, the term "castor oil" is especially understood to mean castor oil as described in the Rompp Chemie Lexikon, 10th edition, Thieme Verlag.

In the present document, the term "open time", also called "open wait time", is preferably understood to mean the open time as described in Römpp Chemie Lexikon, online version, Georg Thieme Verlag, retrieved on Jul. 16, 2018.

In the present document, the term "cathodic electrocoat", is preferably understood to mean cationic electrocoats as described in Rompp Chemie Lexikon, online version, Georg Thieme Verlag, retrieved on Jul. 16, 2018.

The polyol component K1 comprises at least one diol A1 having two primary hydroxyl groups and a molecular weight in the range from 60 to 150 g/mol. Diols having a molecular weight of more than 150 g/mol lead to distinctly lower strengths in the cured state.

Suitable diols A1 are especially ethane-1,2-diol, propane-1,3-diol, butane-1,4-diol, pentane-1,5-diol, hexane-1,6-diol, cyclohexane-1,3-dimethanol, cyclohexane-1,4-dimethanol and diethylene glycol. These diols have primary hydroxyl groups with barely any steric hindrance which are particularly reactive with isocyanate groups.

The diol A1 is more preferably a linear diol, especially selected from the group consisting of propane-1,3-diol, butane-1,4-diol and pentane-1,5-diol. These diols are particularly easy to handle since they are barely hydrophilic and are liquid at room temperature, and form chain segments rich in urethane bonds in the course of curing of the adhesive, which promotes high strengths coupled with good extensibility over a wide temperature range. Among these, particular preference is given to butane-1,4-diol and pentane-1,5-diol; most preferred is butane-1,4-diol.

A suitable triol A2 is especially a polyoxyalkylene triol, also called polyether triol. These are polymerization products of ethylene oxide, 1,2-propylene oxide, 1,2- or 2,3-butylene oxide or mixtures thereof. They are typically polymerized with the aid of a starter molecule having three active hydrogen atoms, for example glycerol, 1,1,1-trimethylolethane, 1,1,1-trimethylolpropane or mixtures thereof.

Preferred triols A2 are polyoxypropylene triols, polyoxyethylene triols and polyoxypropylene-polyoxyethylene triols.

More preferably, the triol A2 has primary hydroxyl groups, most preferably exclusively primary hydroxyl groups.

Particularly preferred triols A2 are what are called "EO-endcapped" (ethylene oxide-endcapped) polyoxypropylene triols. These are specific polyoxypropylene-polyoxyethylene triols that are obtained, for example, when pure polyoxypropylene triols, on conclusion of the polypropoxylation reaction, are further alkoxylated with ethylene oxide and hence have primary hydroxyl groups. They have the advantage over pure polyoxyethylene triols that they are less hydrophilic and are liquid at room temperature.

The triol A2 preferably has an average OH functionality in the range from 2.2 to 3. Such triols A2 afford adhesives having good mechanical properties.

The triol A2 preferably has an average molecular weight in the range from 3'000 to 8'000 g/mol, more preferably from 4'000 to 6'000 g/mol, most preferably from 4'500 to 5'000 g/mol. Such a triol has a good combination of high functionality and chain length, so as thus to obtain an adhesive having good mechanical properties.

The polyol component K1 further comprises at least one polyester polyol A3 based on dimer fatty acids and/or dimer fatty alcohols.

Preferably, the at least one polyester polyol A3 is a polyester polyol A3 based on dimer fatty acids.

The at least one polyester polyol A3 is preferably a polyester polyol A3 based on dimer fatty acids formed from C10-C30 fatty acids, more preferably C12-C25 fatty acids, especially C14-C22 fatty acids.

The at least one polyester polyol A3 is preferably a polyester polyol A3 based on dimer fatty acids selected from the list consisting of dimerization products of fatty acids selected from the list consisting of oleic acid, linoleic acid, linolenic acid, palmitoleic acid and elaidic acid.

The dimerization products of the unsaturated fatty acid mixtures that are obtained in the hydrolysis of natural fats and oils, for example sunflower oil, soya oil, olive oil, rapeseed oil, cottonseed oil and tall oil, may likewise be used. In addition to the dimer fatty acids, the dimerization typically has the effect that there are varying amounts of oligomeric fatty acids (called "trimers") and residues of monomeric fatty acids (called "monomers") or esters thereof. Suitable dimer fatty acids have a dimer acid content of more than 60%, preferably more than 75%, more preferably in the range from 90% to 99.5%, especially 95% to 99% and especially 97% to 99%.

Suitable commercially available polyester polyols A3 include amorphous materials, preferably materials that are liquid at room temperature; available materials are, for example, Dynacoll® 7360, 7380, 7330, 7231, 7250 (Evonik), Rucoflex® S-105-10 (Bayer), Stepanpol® PN110 (Stepan), Priplast® 1838, 3196 (Croda).

The polyester polyol A3 preferably has an average molecular weight in the range from 500 to 10000 g/mol, 500 to 7000 g/mol, 500 to 5000 g/mol, especially 1000 to 3000 g/mol.

The at least one polyester polyol A3 is preferably a diol.

Such polyester polyols A3 are advantageous in that the adhesive, after preliminary curing, especially IR preliminary curing at 150° C. for 40 seconds, thus has better adhesion on cathodically electrocoated substrates. This is especially true in the case when lap shear strength is determined immediately after preliminary curing, when the adhesive is still in the heated state. Moreover, such polyester polyols A3 lead to an improvement in pot life.

Preferably, the polyol component K1 further comprises at least one aliphatic polyol A4 which is a hydroxylation product of a triglyceride based on fatty acids.

The fatty acids are preferably hydroxy-functional fatty acids. The preferred hydroxyl groups are aliphatically bonded primary and/or secondary hydroxyl groups, especially aliphatically bonded secondary hydroxyl groups.

The fatty acids are preferably fatty acids that individually contain between 10 and 30 carbon atoms, especially between 16 and 20 carbon atoms, and are free of aromatic groups.

Preferred aliphatic polyols A4 have an average OH functionality in the range from 2 to 8, more preferably from 2 to 4 and most preferably from 2 to 3.

The aliphatic polyols A4 are preferably liquid at 25° C. and have hydroxyl values between 20 and 300 mg KOH/g (corresponding to a range of hydroxyl equivalent weights from 2800 to 190). An even more preferred range of hydroxyl values is from 50 to 200 mg KOH/g (corresponding to a hydroxyl equivalent weight range from 1100 to 280).

The aliphatic polyol A4 is preferably a hydroxylation product based on soya oil, also called soybean oil, or a hydroxylation product based on castor oil, more preferably a hydroxylation product based on castor oil.

The aliphatic polyol A4 is more preferably a hydroxylation product of soya oil, also called soybean oil, or a hydroxylation product of castor oil, more preferably a hydroxylation product of castor oil.

Such aliphatic polyols A4 are advantageous in that the adhesive thus has faster development of adhesion, especially after 1 h, or after 24 h, at room temperature.

Moreover, the presence of the aliphatic polyol A4 leads to an improvement in pot life and to higher values of modulus of elasticity, tensile strength and elongation at break. It has further been found that, surprisingly, the addition of aliphatic polyol A4 leads to an improvement in the storage stability to component K1.

Preferably, the diol A1, the triol A2, the polyester polyol A3 and optionally the aliphatic polyol A4 are present in the adhesive in such an amount that the weight ratio (A1+A2)/(A3+A4) is in the range from 0.3 to 1.3, 0.35 to 1.1, 0.4 to 0.9, especially 0.5 to 0.8.

If the weight ratio is less than 0.3, this is disadvantageous in that this leads to lower values for strength and modulus of elasticity. If the weight ratio is more than 1.3, this is disadvantageous in that this leads to lower values for adhesion after preliminary curing.

It is further advantageous when the diol A1 and the triol A2 are present in the adhesive in such an amount that the weight ratio A1/A2 is in the range from 0.1 to 0.5, 0.15 to 0.4, 0.2 to 0.4, especially 0.25 to 0.35.

Such a weight ratio is advantageous in that particularly advantageous values for strength and modulus of elasticity are thus obtained for a structural adhesive.

It may further be advantageous when the polyester polyol A3 and the optionally present aliphatic polyol A4 are present in the adhesive in such an amount that the weight ratio A3/A4 is in the range from 1.0 to 3.0, 1.2 to 2.5, 1.3 to 2.0, 1.3 to 1.8, especially 1.35 to 1.6.

If the weight ratio is less than 1.0, this is disadvantageous in that this leads to lower values for adhesion after preliminary curing. If the weight ratio is more than 3.0, this is disadvantageous in that this leads to lower storage stability and reduced thermal stability.

The polyisocyanate component K2 comprises at least one polyisocyanate B1 and/or at least one polyurethane polymer B2 having isocyanate groups. The polyisocyanate component K2 preferably comprises at least one polyurethane polymer B2 having isocyanate groups.

Suitable polyisocyanates B1 are especially monomeric di- or triisocyanates and also oligomers, polymers, and derivatives of monomeric di- or triisocyanates, and any mixtures thereof.

Suitable aromatic monomeric di- or triisocyanates are especially tolylene 2,4- and 2,6-diisocyanate and any mixtures of these isomers (TDI), diphenylmethane 4,4'-, 2,4'- and 2,2'-diisocyanate and any mixtures of these isomers (MDI), phenylene 1,3- and 1,4-diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane and tris(4-isocyanatophenyl) thiophosphate.

Suitable aliphatic monomeric di- or triisocyanates are in particular tetramethylene 1,4-diisocyanate, 2-methylpentamethylene 1,5-diisocyanate, hexamethylene 1,6-diisocyanate (HDI), 2,2,4- and 2,4,4-trimethylhexamethylene 1,6-diisocyanate (TMDI), decamethylene 1,10-diisocyanate, dodecamethylene 1,12-diisocyanate, lysine diisocyanate and lysine ester diisocyanate, cyclohexane 1,3- and 1,4-diisocyanate, 1-methyl-2,4- and -2,6-diisocyanatocyclohexane and any mixtures of these isomers (HTDI or H6TDI), 1-isocyanato-3,3,5-trimethyl-5-isocyanatomethylcyclohexane (=isophorone diisocyanate or IPDI), perhydrodiphenylmethane 2,4'- and 4,4'-diisocyanate (HMDI or H12MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethylxylylene 1,3- and 1,4-diisocyanate (m- and p-TMXDI) and bis(1-isocyanato-1-methylethyl)naphthalene, dimer and trimer fatty acid isocyanates such as 3,6-bis(9-isocyanatononyl)-4,5-di-(1-heptenyl)cyclohexene (dimeryl diisocyanate), and α,α,α',α',α'', α''-hexamethylmesitylene 1,3,5-triisocyanate.

Suitable oligomers, polymers, and derivatives of the monomeric di- and triisocyanates mentioned are especially those derived from MDI, TDI, HDI, and IPDI. Especially suitable among these are commercially available types, especially HDI biurets such as Desmodur® N 100 and N 3200 (from Bayer), Tolonate® HDB and HDB-LV (from Rhodia), and Duranate® 24A-100 (from Asahi Kasei); HDI isocyanurates such as Desmodur® N 3300, N 3600, and N 3790 BA (all from Bayer), Tolonate® HDT, HDT-LV, and HDT-LV2 (from Rhodia), Duranate® TPA-100 and THA-100 (from Asahi Kasei), and Coronate® HX (from Nippon Polyurethane); HDI uretdiones such as Desmodur® N 3400 (from Bayer); HDI iminooxadiazinediones such as Desmodur® XP 2410 (from Bayer); HDI allophanates such as Desmodur® VP LS 2102 (from Bayer); IPDI isocyanurates, for example in solution as Desmodur® Z 4470 (from Bayer) or in solid form as Vestanat® T1890/100 (from Degussa); TDI oligomers such as Desmodur® IL (from Bayer); and also mixed isocyanurates based on TDI/HDI, for example as Desmodur® HL (from Bayer). Also especially suitable are forms of MDI that are liquid at room temperature (called "modified MDI"), which are mixtures of MDI with MDI derivatives such as, in particular, MDI carbodiimides or MDI uretonimines or MDI urethanes, known by trade names such as Desmodur® CD, Desmodur® PF, Desmodur® PC (all from Bayer) or Isonate® M 143 (from Dow), and mixtures of MDI and MDI homologs (polymeric MDI or PMDI), available under trade names such as Desmodur® VL, Desmodur® VL50, Desmodur® VL R10, Desmodur® VL R20, Desmodur® VH 20 N, and Desmodur® VKS 20F (all from Bayer), Isonate® M 309, Voranate® M 229 and Voranate® M 580 (all from Dow) or Lupranat® M 10 R (from BASF). The aforementioned oligomeric polyisocyanates in practice are typically mixtures of substances having different degrees of oligomerization and/or chemical structures. They preferably have an average NCO functionality of 2.1 to 4.0.

Preferred polyisocyanates B1 are forms of MDI that are liquid at room temperature. These are especially what are called polymeric MDI, and MDI having fractions of oligomers or derivatives thereof. The content of MDI (=diphenylmethane 4,4'-, 2,4'- or 2,2'-diisocyanate and any mixtures of these isomers) in such liquid forms of MDI is preferably 50% to 95% by weight, more preferably 60% to 90% by weight.

Particularly preferred polyisocyanates B1 are polymeric MDI and especially MDI types that are liquid at room temperature and contain fractions of MDI carbodiimides or adducts thereof.

These polyisocyanates B1 give particularly good processing properties and particularly high strengths.

The polyisocyanate component K2 preferably comprises at least one polyurethane polymer B2 having isocyanate groups.

The polyurethane polymer B2 preferably has 50 to 95 percent by mass, especially 70 to 90 percent by mass, of polyoxyalkylene units, more preferably polyoxyethylene and/or polyoxypropylene units, especially polyoxypropylene units. Such a polyurethane polymer has low viscosity and enables good extensibilities.

The polyurethane polymer B2 preferably has an average molecular weight in the range from 1'000 to 20'000 g/mol, more preferably 2'000 to 10'000 g/mol.

The polyurethane polymer B2 preferably has an average NCO functionality in the range from 1.7 to 3, especially from 1.8 to 2.5. Such a polyurethane polymer enables good processing properties and good mechanical properties in the cured state.

More preferably, the polyurethane polymer B2 has an average NCO functionality in the range from 2.05 to 2.5. Such a polyurethane polymer enables particularly good extensibilities coupled with high strength.

The polyurethane polymer B2 preferably has a content of free isocyanate groups of 1% to 10% by weight, more preferably 1% to 5% by weight.

A suitable polyurethane polymer B2 having isocyanate groups is obtainable from the reaction of at least one polyisocyanate with at least one polyol. This reaction can be effected when the polyol and the polyisocyanate are reacted by customary methods, for example at temperatures of 50° C. to 100° C., optionally with additional use of suitable catalysts, with metered addition of the polyisocyanate in such a way that the isocyanate groups thereof are in a stoichiometric excess relative to the hydroxyl groups of the polyol. Advantageously, the polyisocyanate is metered in so as to comply with an NCO/OH ratio of 1.3 to 5, especially one of 1.5 to 3. The "NCO/OH ratio" is understood to mean the number of isocyanate groups used relative to the number of hydroxyl groups used.

Suitable polyols for preparation of a polyurethane polymer B2 are especially the following commercially available polyols or mixtures:

- polyoxyalkylene polyols, also called polyether polyols or oligoetherols, that are polymerization products of ethylene oxide, 1,2-propylene oxide, 1,2- or 2,3-butylene oxide, oxetane, tetrahydrofuran or mixtures thereof, possibly polymerized with the aid of a starter molecule having two or more active hydrogen atoms, such as water, ammonia or compounds having two or more OH or NH groups, for example ethane-1,2-diol, propane-1,2- and -1,3-diol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, cyclohexane-1,3- and -1,4-dimethanol, bisphenol A, hydrogenated bisphenol A, 1,1,1-trimethylolethane, 1,1,1-trimethylolpropane, glycerol, aniline, and mixtures of the aforementioned compounds. It is possible to use either polyoxyalkylene polyols having a low degree of unsaturation (measured to ASTM D-2849-69 and reported in milliequivalents of unsaturation per gram of polyol (meq/g)), prepared, for example, with the aid of what are called double metal cyanide complex catalysts (DMC catalysts), or polyoxyalkylene polyols having a higher degree of unsaturation, prepared, for example, with the aid of anionic catalysts such as NaOH, KOH, CsOH or alkali metal alkoxides. Polyoxyalkylene diols or polyoxyalkylene triols are particularly suitable, especially polyoxyethylene- and polyoxypropylene di- and triols. Polyoxyalkylene diols and triols having a degree of unsaturation lower than 0.02 meq/g and having a molecular weight in the range from 1'000-30'000 g/mol are very particularly suitable, as are polyoxypropylene diols and triols having a molecular weight of 400-8'000 g/mol.

What are called ethylene oxide-terminated (EO-endcapped/ethylene oxide-endcapped) polyoxypropylene polyols are especially suitable.

- Styrene-acrylonitrile- or acrylonitrile-methyl methacrylate-grafted polyether polyols.
- Polyester polyols, also called oligoesterols, prepared by known methods, especially the polycondensation of hydroxycarboxylic acids or the polycondensation of aliphatic and/or aromatic polycarboxylic acids with di- or polyhydric alcohols.

Especially suitable polyester polyols are those that are prepared from di- to trihydric, especially dihydric, alcohols, for example ethylene glycol, diethylene glycol, propylene glycol, dipropylene glycol, neopentyl glycol, butane-1,4-diol, pentane-1,5-diol, 3-methylhexane-1,5-diol, hexane-1,6-diol, octane-1,8-diol, decane-1,10-diol, dodecane-1,12-diol, 1,12-hydroxystearyl alcohol, 1,4-cyclohexanedimethanol, dimer fatty acid diol (dimer diol), neopentyl glycol hydroxypivalate, glycerol, 1,1,1-trimethylolpropane or mixtures of the aforementioned alcohols, with organic di- or tricarboxylic acids, especially dicarboxylic acids, or anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic anhydride, or mixtures of the aforementioned acids, and also polyester polyols formed from lactones, for example from 8-caprolactone and starters such as the aforementioned di- or trihydric alcohols.

- Particularly suitable polyester polyols are polyester diols.
- Polycarbonate polyols as obtainable by reaction, for example, of the abovementioned alcohols—used to form the polyester polyols—with dialkyl carbonates, diaryl carbonates or phosgene.
- Block copolymers bearing at least two hydroxyl groups and having at least two different blocks having polyether, polyester and/or polycarbonate structure of the type described above, especially polyether polyester polyols.
- Polyacrylate polyols and polymethacrylate polyols.
- Polyhydroxy-functional fats and oils, for example natural fats and oils, especially castor oil; or polyols obtained by chemical modification of natural fats and oils—called oleochemical polyols—for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes, such as alcoholysis or ozonolysis, and subsequent chemical linkage, for example by transesterification or dimerization, of the degradation products or derivatives thereof thus obtained. Suitable degradation products of natural fats and oils are in particular fatty acids and fatty alcohols and also fatty acid esters, in particular the methyl esters (FAME), which can be derivatized to hydroxy fatty acid esters, for example by hydroformylation and hydrogenation.
- Polyhydrocarbon polyols, also called oligohydrocarbonols, such as, for example, polyhydroxy-functional polyolefins, polyisobutylenes, polyisoprenes; polyhydroxy-functional ethylene/propylene, ethylene/butylene or ethylene/propylene/diene copolymers, as produced, for example, by Kraton Polymers; polyhydroxy-functional polymers of dienes, especially of 1,3-butadiene, which can especially also be prepared from anionic polymerization; polyhydroxy-functional copolymers of dienes, such as 1,3-butadiene, or diene mixtures and vinyl monomers, such as styrene, acrylonitrile, vinyl chloride, vinyl acetate, vinyl alcohol, isobutylene and isoprene, for example polyhydroxy-functional acrylonitrile/butadiene copolymers, as can be prepared, for example, from epoxides or amino alcohols and carboxyl-terminated acrylonitrile/butadiene copolymers (commercially available, for example, under the Hypro® (formerly Hycar®) CTBN and CTBNX and ETBN name from Nanoresins AG, Germany, or Emerald Performance Materials LLC); and hydrogenated polyhydroxy-functional polymers or copolymers of dienes.

Preferred polyols for preparation of a polyurethane polymer B2 are polyoxyalkylene polyols, polyester polyols, polycarbonate polyols and polyacrylate polyols. Particular preference is given to polyoxyalkylene polyols, especially polyoxypropylene polyols and polyoxyethylene-polyoxypropylene copolyols.

The polyol for preparation of a polyurethane polymer B2 preferably has an average molecular weight in the range from 500 to 20'000 g/mol, especially 1'000 to 8'000 g/mol.

The polyol for preparation of a polyurethane polymer B2 is preferably a diol or a mixture of at least one diol and at least one triol, especially a mixture of at least one diol and at least one triol.

Suitable polyisocyantes for preparation of a polyurethane polymer B2 are especially the following commercially available polyisocyanates or mixtures:

tolylene 2,4- and 2,6-diisocyanate and any mixtures of these isomers (TDI), diphenylmethane 4,4'-, 2,4'- and 2,2'-diisocyanate and any mixtures of these isomers (MDI), phenylene 1,3- and 1,4-diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), 1,3,5-tris(isocyanatomethyl)benzene, 2-methylpentamethylene 1,5-diisocyanate, hexamethylene 1,6-diisocyanate (HDI), 2,2,4- and 2,4,4-trimethylhexamethylene 1,6-diisocyanate (TMDI), decamethylene 1,10-diisocyanate, dodecamethylene 1,12-diisocyanate, lysine and lysine ester diisocyanate, cyclohexane 1,3- and 1,4-diisocyanate, 1-methyl-2,4- and -2,6-diisocyanatocyclohexane and any mixtures of these isomers (HTDI or H6TDI), 1-isocyanato-3,3,5-trimethyl-5-isocyanatomethylcyclohexane (=isophorone diisocyanate or IPDI), perhydrodiphenylmethane 2,4'- and -4,4'-diisocyanate (HMDI or H12MDI), 1,4-diisocyanato-2,2,6-trimethylcyclohexane (TMCDI), 1,3- and 1,4-bis(isocyanatomethyl)cyclohexane, m- and p-xylylene diisocyanate (m- and p-XDI) and m- and p-tetramethyl-1,3- and -1,4-xylylene diisocyanate (m- and p-TMXDI). Preference is given to MDI, TDI, IPDI and HDI. Particular preference is given to MDI.

Most preferred is diphenylmethane 4,4'-diisocyanate.

The polyurethane polymer B2 having isocyanate groups is preferably obtainable from the reaction of diphenylmethane 4,4'-diisocyanate with at least one polyol. In this way, the curing of the adhesive affords particularly effective hard segments and hence particularly high strengths.

Preferably, the polyisocyanate B1 and the polyisocyanate used for preparation of the polyurethane prepolymer B2 are a different type of polyisocyanate.

Preferably, the polyurethane polymer B2 is not prepared in the presence of the polyisocyanate B1.

A particularly preferred polyurethane adhesive contains a polyisocyanate component K2 comprising
at least one polyurethane polymer B2 having isocyanate groups, wherein the urethane groups and free isocyanate groups are preferably derived from diphenylmethane 4,4'-diisocyanate.

The polyurethane adhesive may, as a constituent of the polyol component K1, additionally contain further substances reactive with isocyanate groups. More particularly, the polyol component K1 may contain at least one polyol and/or at least one di- or polyhydric alcohol of low molecular weight, which have been mentioned for the preparation of the polyurethane polymer B2.

In addition, the polyurethane adhesive may contain catalysts that accelerate the reaction of hydroxyl groups with isocyanate groups, especially organotin, organozinc and organobismuth metal catalysts, for example dibutyltin dilaurate, or tertiary amines, amidines or guanidines, for example 1,4-diazabicyclo[2.2.2]octane (DABCO) or 1,8-diazabicyclo[5.4.0]undec-7-ene (DBU).

Thermal activation can be achieved especially by virtue of the tertiary amines, amidines or guanidines reversibly forming a salt with phenol or carboxylic acids, especially phenolic or other aromatic carboxylic acids, which is broken down when the temperature is increased. The polyurethane adhesive therefore preferably contains at least one catalyst selected from the list consisting of tertiary amines, amidines and guanidines that are in the form of a salt with phenol or carboxylic acids. More particularly, the salt is one that is broken down when the temperature is increased, especially at a temperature of 80-170° C.

In addition, the polyurethane adhesive may contain further constituents as known to the person skilled in the art from two-component polyurethane chemistry. These may be present in just one component or in both. Such additional constituents present may especially be solvents, plasticizers and/or extenders, fillers such as, in particular, carbon blacks, chalks or sheet silicates, and also pigments, rheology modifiers such as, in particular, amorphous silicas, desiccants such as, in particular, zeolites, adhesion promoters such as, in particular, trialkoxysilanes, stabilizers against oxidation, heat, light, and UV radiation, flame-retardant substances, and also surface-active substances, especially wetting agents.

The polyol component K1 and the polyisocyanate component K2 are advantageously formulated in such a way that their mixing ratio in volume is in the range from 1:3 to 3:1, especially 1:2 to 2:1. It is particularly preferably in the region of 0.8:1.2.

The mixing ratio between components K1 and K2 is preferably such that, in the mixed polyurethane adhesive, the ratio between the number of isocyanate groups and the number of isocyanate-reactive groups, especially the sum total of OH and NH2 groups, prior to curing is in the range from 1.3 to 0.8, 1.2 to 0.9, 1.2 to 0.95, 1.2 to 1, preferably 1.15 to 1.05.

The two components K1 and K2 are prepared separately from one another and, at least for the polyisocyanate component K2, with exclusion of moisture. Components K1 and K2 are typically each stored in a dedicated container. The further constituents of the polyurethane adhesive may be present as constituent of the polyol component K1 or of the polyisocyanate component K2, with further constituents that are reactive toward isocyanate groups preferably being a constituent of the polyol component K1. A suitable container for storing the respective component is especially a drum, a hobbock, a bag, a bucket, a can, a cartridge or a tube. Components K1 and K2 are both storage-stable, meaning that they can be stored prior to their use for several months up to one year or longer, without any change in their respective properties to a degree relevant to their use.

The polyol component K1 and the polyisocyanate component K2 are stored separately from one another prior to the use of the adhesive and are mixed only on or immediately prior to application. They are advantageously present in a package consisting of two separate chambers.

In a further aspect, the invention comprises a pack consisting of a package having two separate chambers which respectively contain the polyol component K1 and the polyisocyanate component K2 of the polyurethane adhesive.

Preferred packs of this kind are firstly side-by-side double cartridges or coaxial cartridges in which two tubular chambers are arranged alongside one another or concentrically and sealed in an air- and moisture-tight manner with pistons. By driving these pistons, it is possible to express the components out of the cartridge. The opposite ends of the tubes from the pistons are modified, optionally by means of an adapter, in such a way that the chamber openings are directly connected to one another via a partition wall in the region of the opening. Advantageously, there is a thread in the region of the exit opening of the chambers, such that a static mixer or dynamic mixer can be tightly attached. Such packs are preferred especially for small-scale applications, especially for fill volumes up to 1 liter.

For applications in large volumes, especially for applications in industrial manufacture, the two components are advantageously dispensed into drums or hobbocks and stored. On application, the components are expressed by means of delivery pumps and metered via conduits of a mixing apparatus as customarily used for two-component adhesives in industrial manufacture.

The mixing is typically effected via static mixers or with the aid of dynamic mixers. In the course of mixing, it has to be ensured that the polyol component K1 and the polyisocyanate component K2 are mixed very homogeneously. If the two components are mixed poorly, local variances from the advantageous mixing ratio will occur, which can result in a deterioration in the mechanical properties. In order to visually monitor the quality of mixing, it may be advantageous when the two components have two different colors. There is good mixing when the mixed adhesive has a homogeneous mixed color without visible stripes or streaks.

On contact of the polyol component K1 with isocyanate groups of the polyisocyanate component K2, the curing commences through chemical reaction. The hydroxyl groups of the diol A1, of the triol A2 and of the polyester polyol A3 and any further substances reactive toward isocyanate groups react here with isocyanate groups present. Excess isocyanate groups react with moisture present. As a result of these reactions, the polyurethane adhesive cures to give a solid material. This process is also referred to as crosslinking.

The present invention thus also provides a cured polyurethane adhesive obtained from the curing of a polyurethane adhesive as described in the present document.

A further aspect of the present invention relates to a method of bonding a first substrate to a second substrate, comprising the steps of:
a) mixing the above-described polyol component K1 and polyisocyanate component K2,
b) applying the mixed polyurethane adhesive to at least one of the substrate surfaces to be bonded,
c) joining the substrates to be bonded within the open time,
d) heating the polyurethane adhesive to a temperature of 80-170° C., especially for 30 seconds-5 minutes,
e) curing the polyurethane adhesive.

These two substrates may consist of the same material or different materials.

Suitable substrates in this method of bonding are especially
glass, glass ceramic, glass mineral fiber mats;
metals and alloys such as aluminum, iron, steel and nonferrous metals, and also surface-finished metals and alloys such as galvanized or chromed metals, especially cathodically electrocoated metals and alloys;
coated and painted substrates, such as powder-coated metals or alloys and painted sheet metal;
plastics, such as polyvinyl chloride (rigid and flexible PVC), acrylonitrile-butadiene-styrene copolymers (ABS), polycarbonate (PC), polyamide (PA), poly(methyl methacrylate) (PMMA), polyester, epoxy resins, especially epoxy-based thermosets, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), where the plastics may preferably have been surface-treated by means of plasma, corona or flames;
fiber-reinforced plastics, such as carbon fiber-reinforced plastics (CFP), glass fiber-reinforced plastics (GFP) and sheet-molding compounds (SMC);
wood, woodbase materials bonded with resins, for example phenolic, melamine or epoxy resins, resin-textile composites and further polymer composites; and
concrete, mortar, brick, plaster, and natural stone such as granite, limestone, sandstone or marble.

In this method, one or both substrates is preferably a metal or an alloy, especially a cathodically electrocoated metal or a cathodically electrocoated alloy.

The substrates can be pretreated if required prior to the application of the adhesive. Pretreatments of this kind especially include physical and/or chemical cleaning methods, and the application of an adhesion promoter, an adhesion promoter solution or a primer.

It may further be advantageous when, in step d), the polyurethane adhesive is heated to a temperature of 90-170° C., preferably to a temperature of 100-160° C., especially to a temperature of 120-160° C., more preferably to a temperature of 140-160° C.

Preferably, the polyurethane adhesive is heated to the aforementioned temperature for 30 seconds-5 minutes, 30 seconds-4 minutes, 30 seconds-3 minutes, 40 seconds-2 minutes.

It may further be advantageous when, in step d), only a portion of the polyurethane adhesive applied is heated, especially 5-30%, preferably 10-20%. The polyurethane adhesive is preferably applied in step b) in the form of an adhesive bead and, in step d), 5-30%, preferably 10-20%, of the length of the adhesive bead applied is heated in step d).

Preferably, the adhesive heated in step d) immediately, especially 10-100 seconds, preferably 15-30 seconds, after step d), has a lap shear strength of more than 1.5 MPa, more than 2.0 MPa, especially more than 2.2 MPa. The adhesive preferably also shows a cohesive fracture profile.

The heating in step d) especially takes place by means of an infrared source, hot air gun or induction heater, or in an oven, more preferably by means of an infrared source.

This method of bonding described gives rise to an article in which the adhesive bonds two substrates to one another.

This article is especially a sandwich element of a lightweight structure, a built structure, for example a bridge, an industrial good or a consumer good, especially a window, a rotor blade of a wind turbine or a mode of transport, especially a vehicle, preferably an automobile, a bus, a truck, a rail vehicle or a 2018-0036 22 ship, or else an aircraft or helicopter, or an installable component of such an article.

The polyurethane adhesive described has very good properties as structural adhesive.

Structural adhesive refers here to an adhesive which, in the cured state, forms part of the load-bearing structure of the bonded components. The structural adhesive is thus an important bonding element of the construction, within which it binds two components or substrates. Correspondingly high demands are made on its mechanical properties.

Examples
Substances used:

| | |
|---|---|
| A1, diol | butane-1,4-diol from LyondellBasell |
| A2, triol | EO-endcapped polyoxypropylene triol, OH number 35.0 mg KOH/g (Voranol ® CP 4755 from Dow) |
| A3, polyester polyol | Room temperature liquid polyester diol based on dimer fatty acids of C14-C22 fatty acids, dimer acid content of more than 95%, average molecular weight about 2000 g/mol |
| A4, aliphatic polyol | Room temperature liquid hydroxylated castor oil, OH number about 120 mg KOH/g, average OH functionality about 2.2. |
| Polyether diol | EO-endcapped polyoxypropylene diol, OH number about 28 mg KOH/g (Voranol ® EP 1900 from Dow) |
| Cat. | Acid-blocked amine catalyst, tertiary amine based on 1,8-Diazabicyclo[5.4.0]undec-7-ene (DBU) |
| Carbon black | |
| Zeolite | Sylosiv ® A3 from Grace |

Polymer-1 was prepared by reacting 1300 g of polyoxypropylene diol (Acclaim® 4200 N, from Bayer; OH number 28.5 mg KOH/g), 2600 g of polyoxypropylene-polyoxyethylene triol (Caradol® MD34-02, from Shell; OH number 35.0 mg KOH/g), 600 g of 4,4'-methylene diphenyl diisocyanate (Desmodur 44 MC L, from Bayer) and 500 g of diisodecyl phthalate by a known method at 80° C. to give an NCO-terminated polyurethane polymer having a content of free isocyanate groups of 2.1% by weight.

Production of Polyurethane Adhesives

For each adhesive, the ingredients specified in table 1 were processed in the specified amounts (in parts by weight) of the polyol component K1 by means of a vacuum dissolver with exclusion of moisture to give a homogeneous paste, and stored. The ingredients of the polyisocyanate component K2 specified in table 1 were likewise processed and stored. Subsequently, the two components were processed in the specified mixing ratio K2/K1 (in parts by weight, w/w) by means of a SpeedMixer® (DAC 150 FV, Hauschild) for 30 seconds to give a homogeneous paste, and the latter was tested immediately as follows:

For determination of the mechanical properties, the adhesive was fashioned into dumbbell shape according to ISO 527, Part 2, 1B, and stored/cured at 25° C. for 24 h and then at 80° C. for 3 h.

After a conditioning period of 24 h at 23° C., modulus of elasticity in the range from 0.05 to 0.25% elongation, tensile strength and elongation at break of the test specimens thus produced were measured to ISO 527 on a Zwick Z020 tensile tester at the respective temperature specified in the table and a testing speed of 50 mm/min.

Lap shear strength was measured by producing various test specimens, in each case by applying the adhesive 1 minute after the end of the mixing time between two isopropanol-degreased cathodically-electrocoated steel sheets in a layer thickness of 2 mm and over an overlapping bonding area of 15×45 mm. These test specimens were used to determine lap shear strength to DIN EN 1465, with different storage of the test specimens prior to the measurement: either, as a measure for early strength, at 23° C. for 1 h ("ZSF 1 h RT") or at 23° C. for 24 h ("ZSF 24 h RT"), and measured at 23° C., or, in order to measure lap shear strength in the fully cured state, at 23° C. for 7 days, followed by measurement at 23° C. ("ZSF 7 d RT"), or at 23° C. for 7 days and then at 80° C. for 3 h, and then measurement at 80° C. (heat resistance, "ZSF 7 d RT (80° C.)"). For measurement of lap shear strength after storage at high temperature and humidity ("ZSF 3 d HTH"), the test specimens were stored at 80° C. and 100% air humidity for 3 days, then stored at 23° C. for 3 h, and then measured at 23° C.

Lap shear strength immediately after preliminary curing ("ZSF precuring") was measured by producing various test specimens, in each case by applying the adhesive 1 minute after the end of the mixing time between two isopropanol-degreased cathodically-electrocoated steel sheets in a layer thickness of 2 mm and over an overlapping bonding area of 15×45 mm. These test specimens were heated to a temperature of 150° C. by means of an IR lamp and kept at that temperature for 40 seconds. 15 seconds later, lap shear strength was determined to DIN EN 1465 on the still-hot test specimens (no active cooling of the test specimens).

The attributes (af) and (cf) each denote the fracture profile, where "af" represents an adhesive fracture profile and "cf" a cohesive fracture profile.

Pot life was measured by introducing about 20 g of adhesive (comp. K1 and K2) into a beaker. The clock was started and the two components were mixed thoroughly with a spatula for about 30 seconds. After 30 seconds, the mixture was applied to the lower plate of a rheometer. The plate has been equilibrated to 25° C. Then the measurement was started: plate/plate rheometer from Anton Paar, spindle diameter 25 mm, gap 0.2 mm, temperature 25° C., shear rate 10 1/s. The pot life is the time elapsed since commencement of mixing before the mixture attains a viscosity of 500 Pas.

The viscosity of component K1, or K2 ("Viscosity of component K1/K2") was measured by determination by means of a rheometer as described above.

The viscosity of the mixture of components K1 and K2 ("Viscosity of K1+K2 mixture") was determined by introducing about 20 g of adhesive (comp. K1 and K2) into a beaker and mixing the two components thoroughly with a spatula for about 30 seconds. After 30 seconds, the mixture was measured by means of a rheometer as described above.

The results are reported in table 2.

The attributes (A1+A2)/(A3+A4), A1/A2 and A3/A4 in table 1 are based on the weight ratios of the diols A1, triols A2, polyester polyol A3 and optionally aliphatic polyols A4 present in the respective adhesive.

Rf.1 and Rt.2 are comparative examples; Z-1 and Z-2 are inventive examples.

TABLE 1

| Examples | Rf. 1 | Z-1 | Rf. 2 | Z-2 |
|---|---|---|---|---|
| Polyol component K1: | | | | |
| A1, butane-1,4-diol | 10 | 9 | 6 | 8 |
| A2, polyether triol | 24 | 24 | 24 | 24 |
| Polyether diol | 49 | — | — | — |
| A3 | — | 49 | — | 29 |
| A4 | — | — | 49 | 20 |
| Zeolite | 4 | 4 | 4 | 4 |
| Carbon black | 18 | 16 | 16 | 19 |
| Cat. | 0.7 | 0.7 | 0.7 | 0.7 |
| (A1 + A2)/(A3 + A4) | — | 0.67 | 0.61 | 0.65 |
| A1/A2 | 0.42 | 0.38 | 0.25 | 0.33 |
| A3/A4 | — | — | — | 1.45 |

TABLE 1-continued

| Examples | Rf. 1 | Z-1 | Rf. 2 | Z-2 |
|---|---|---|---|---|
| Polyisocyanate component K2: | | | | |
| Prepolymer-1 | 85 | 85 | 85 | 85 |
| Carbon black | 13 | 13 | 13 | 13 |
| K2/K1 (w/w) | 1/1 | 1/1 | 1/1 | 1/1 |

TABLE 2

| Examples | Rf. 1 | Z-1 | Rf. 2 | Z-2 |
|---|---|---|---|---|
| Viscosity of component K1/K2 [Pas] | 73.6/ 110.5 | 73.6/ 65.3 | 54.6/ 65.3 | 126.6/ 37.4 |
| Pot life [min] | 12 | 12.5 | 12.9 | 13.3 |
| Viscosity of K1 + K2 mixture, [Pas] | 40.1 | 77.3 | 47.5 | 67 |
| ZSF, precuring [MPa] | 2.4 (AF) | 2.4 (CF) | 1.8 (CF) | 2.1 (CF) |
| ZSF, 1 h RT [MPa] | 0.56 CF | 0.32 CF | 0.53 CF | 0.52 CF |
| ZSF, 24 h RT [MPa] | 9.9 CF | 4.0 CF | 8.0 CF | 5.5 CF |
| ZSF, 7 d RT [MPa] | 11.5 CF | 8.5 CF | n.d. | 8.1 CF |
| ZSF, 7 d RT (80° C.) [MPa] | 5.0 CF | 5.3 CF | 3.4 CF | 4.9 CF |
| ZSF, 3 d HTH | 10.2 CF | 10.2 CF | 7.7 CF | 9.5 CF |
| Modulus of elasticity [MPa] | 40 | 36 | 40 | 40 |
| Tensile strength [MPa] | 11.3 | 11.1 | 10.4 | 14.4 |
| Elongation at break [%] | 260 | 230 | 230 | 270 | n.d. not determined

Inventive example Z-1, compared to Rf.1, shows better adhesion after IR preliminary curing at 150° C. for 40 seconds on a cathodically electrocoated substrate. Rather than adhesive fracture characteristics of Rf.1, cohesive fracture characteristics are obtained.

Moreover, comparison of Z-1 with Rf.1 shows an improvement in pot life with otherwise comparable mechanical properties and the adhesion values of final strength (ZSF 7 d RT), and also the adhesion values after storage at high temperature and humidity.

The addition of A4 to the inventive composition Z-2, compared to Z-1, leads to a faster development of adhesion (ZSF 1 h RT and 24 h RT), an improvement in pot life and higher values of modulus of elasticity, tensile strength and elongation at break. It has further been found that, surprisingly, the addition of A4 to component K1 leads to an improvement in storage stability thereof. In the case of storage of component K1 of Z-1 in a cartridge at 40° C. for 7 days, slight separation of component K1 was detected. In the course of the same storage of component K1 of Z-2, by contrast, no separation was detected.

It is further apparent from comparative example Rf.2 that, in the case of compositions containing solely A4 and no A3, adhesion values after IR preliminary curing are significantly lower. Adhesion values for storage at high temperature and humidity and for heat resistance are also significantly worse.

The invention claimed is:

1. A polyurethane adhesive consisting of a polyol component K1 and a polyisocyanate component K2; wherein the polyol component K1 comprises
    at least one diol A1 having two primary hydroxyl groups and a molecular weight in the range from 60 to 150 g/mol,
    at least one triol A2 having an average molecular weight in the range from 1,000 to 10,000 g/mol,
    at least one polyester polyol A3 based on dimer fatty acids and/or dimer fatty alcohols; and
the polyisocyanate component K2 comprises
    at least one polyisocyanate B1 and/or
    at least one polyurethane polymer B2 having isocyanate groups.

2. The polyurethane adhesive as claimed in claim 1, wherein the triol A2 is a polyether triol.

3. The polyurethane adhesive as claimed in claim 1, wherein the triol A2 has exclusively primary hydroxyl groups.

4. The polyurethane adhesive as claimed in claim 1, wherein the at least one polyester polyol A3 is a polyester polyol A3 based on dimer fatty acids formed from C10-C30 fatty acids.

5. The polyurethane adhesive as claimed in claim 1, wherein the polyol component K1 additionally includes at least one aliphatic polyol A4 which is a hydroxylation product of a triglyceride based on fatty acids.

6. The polyurethane adhesive as claimed in claim 5, wherein the aliphatic polyol A4 has an average OH functionality in the range from 2 to 4.

7. The polyurethane adhesive as claimed in claim 5, wherein the aliphatic polyol A4 is a hydroxylation product based on soya oil or a hydroxylation product based on castor oil.

8. The polyurethane adhesive as claimed in claim 1, wherein the mixing ratio in volume between the polyol component K1 and the polyisocyanate component K2 is in the range from 1:3 to 3:1.

9. The polyurethane adhesive as claimed in claim 1, wherein the diol A1, the triol A2, the polyester polyol A3 and optionally an aliphatic polyol A4 are present in the adhesive in such an amount that the weight ratio (A1+A2)/(A3+A4) is in the range from 0.3 to 1.3.

10. The polyurethane adhesive as claimed in claim 1, wherein the diol A1 and the triol A2 are present in the adhesive in such an amount that the weight ratio A1/A2 is in the range from 0.1 to 0.5.

11. The polyurethane adhesive as claimed in claim 1, wherein the polyester polyol A3 and an optionally present aliphatic polyol A4 are present in the adhesive in such an amount that the weight ratio A3/A4 is in the range from 1.0 to 3.0.

12. A method of adhesive bonding of a first substrate to a second substrate, comprising the steps of:
    a) mixing the polyol component K1 and the polyisocyanate component K2 of a polyurethane adhesive as claimed in claim 1,
    b) applying the mixed polyurethane adhesive to at least one of the substrate surfaces to be bonded,
    c) joining the substrates to be bonded within the open time,
    d) heating the polyurethane adhesive to a temperature of 80-170° C.,
    e) curing the polyurethane adhesive.

13. The method as claimed in claim 12, wherein one or both substrates is a metal or an alloy.

14. The method as claimed in claim 12, wherein the polyurethane adhesive is applied in step b) in the form of an adhesive bead and, in step d), 5-30%, of the length of the adhesive bead applied is heated in step d).

15. An article formed from the method of adhesive bonding as claimed in claim 12.

* * * * *